May 25, 1965 W. E. NORDEN 3,184,777
LAWN SWEEPER
Filed March 7, 1963 3 Sheets-Sheet 1
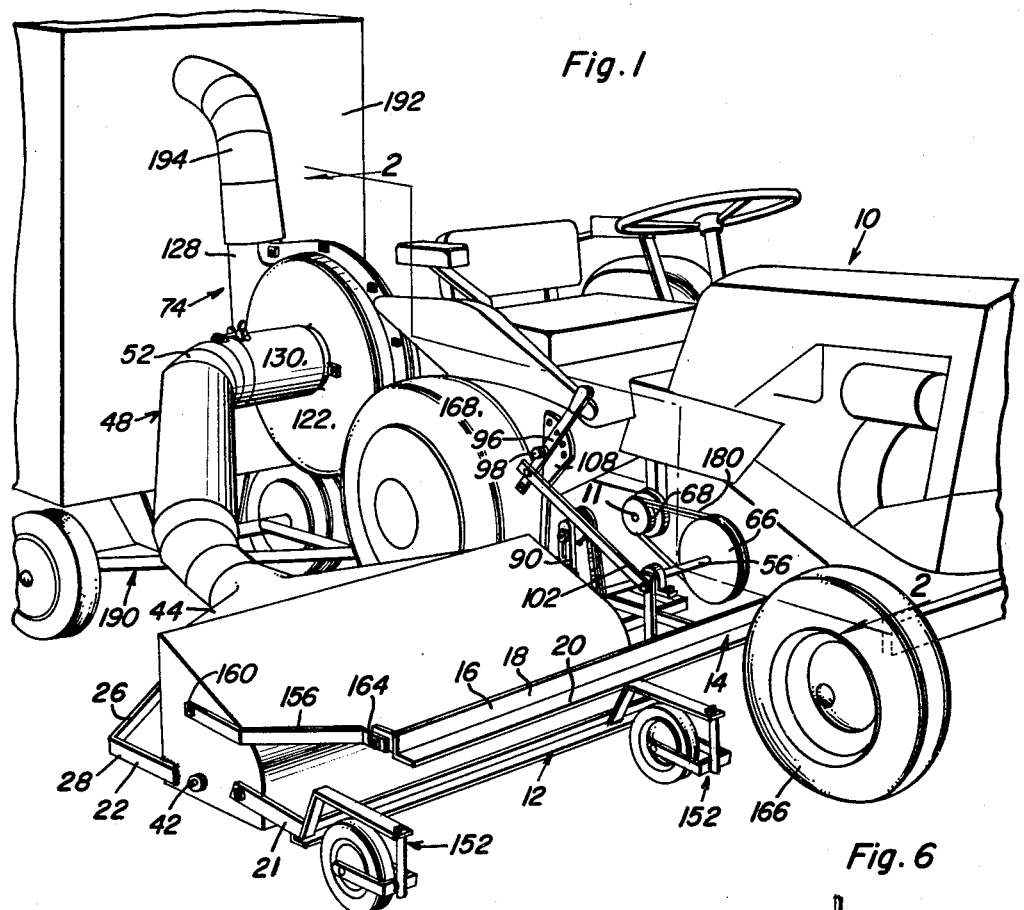
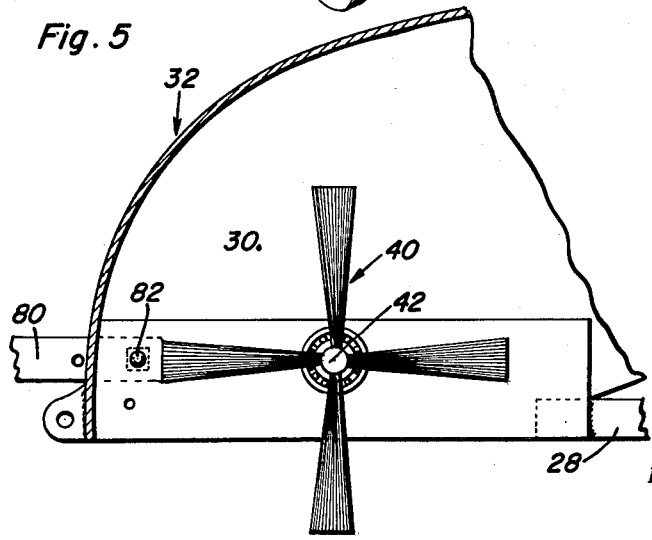
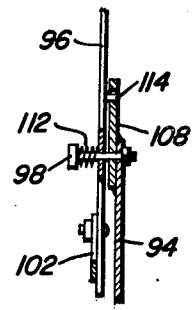
Walter E. Norden
INVENTOR.

May 25, 1965 W. E. NORDEN 3,184,777
LAWN SWEEPER
Filed March 7, 1963 3 Sheets-Sheet 2
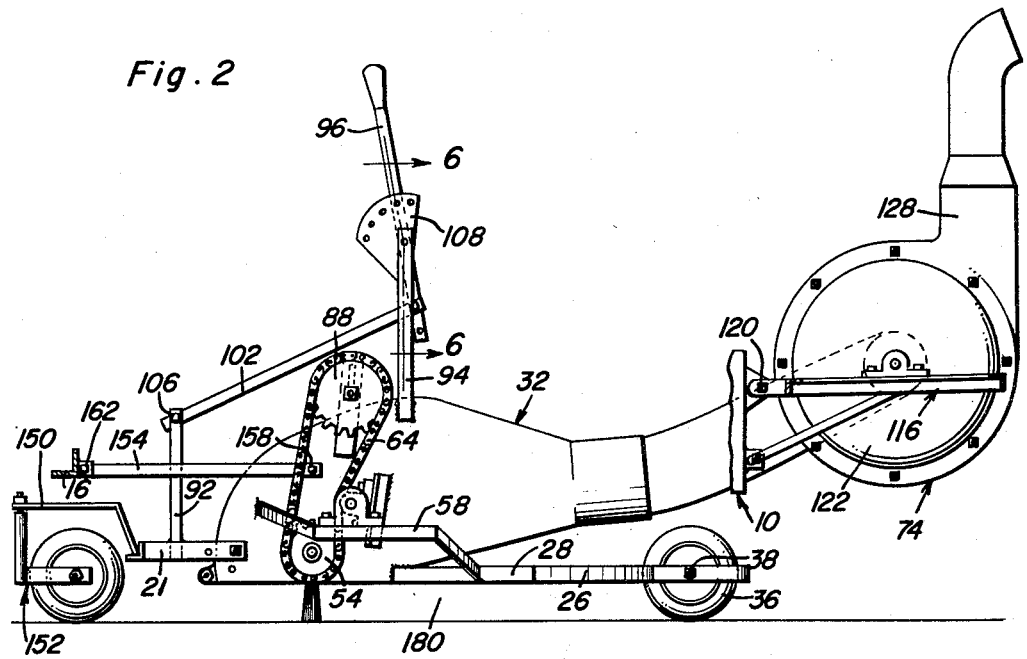
Fig. 2
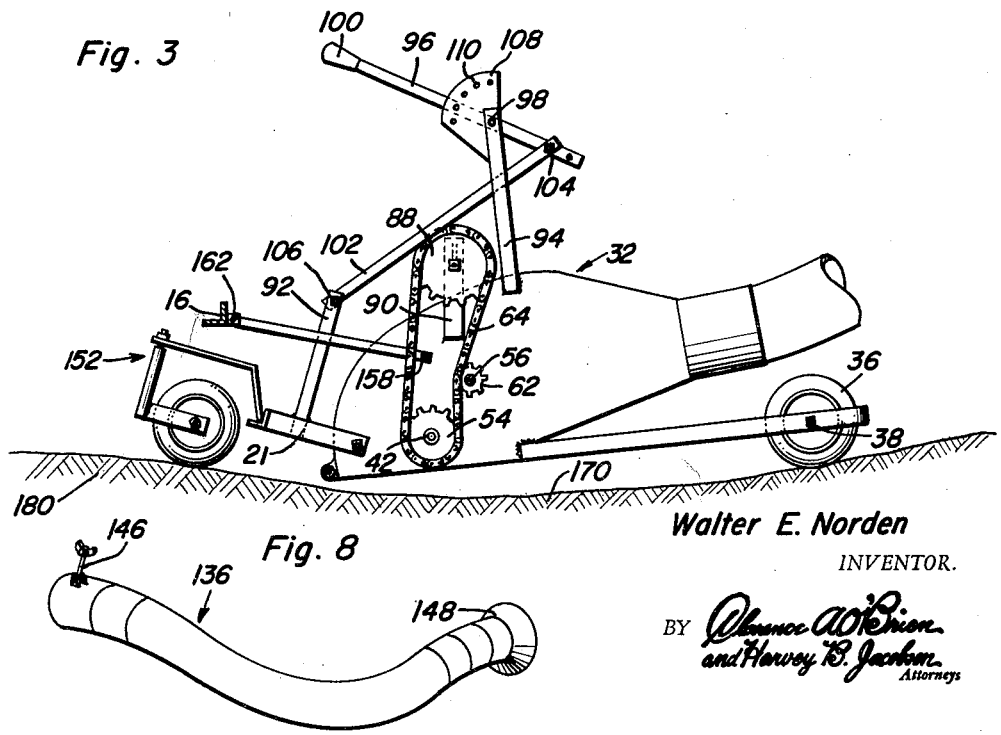
Fig. 3
Fig. 8
Walter E. Norden
INVENTOR.

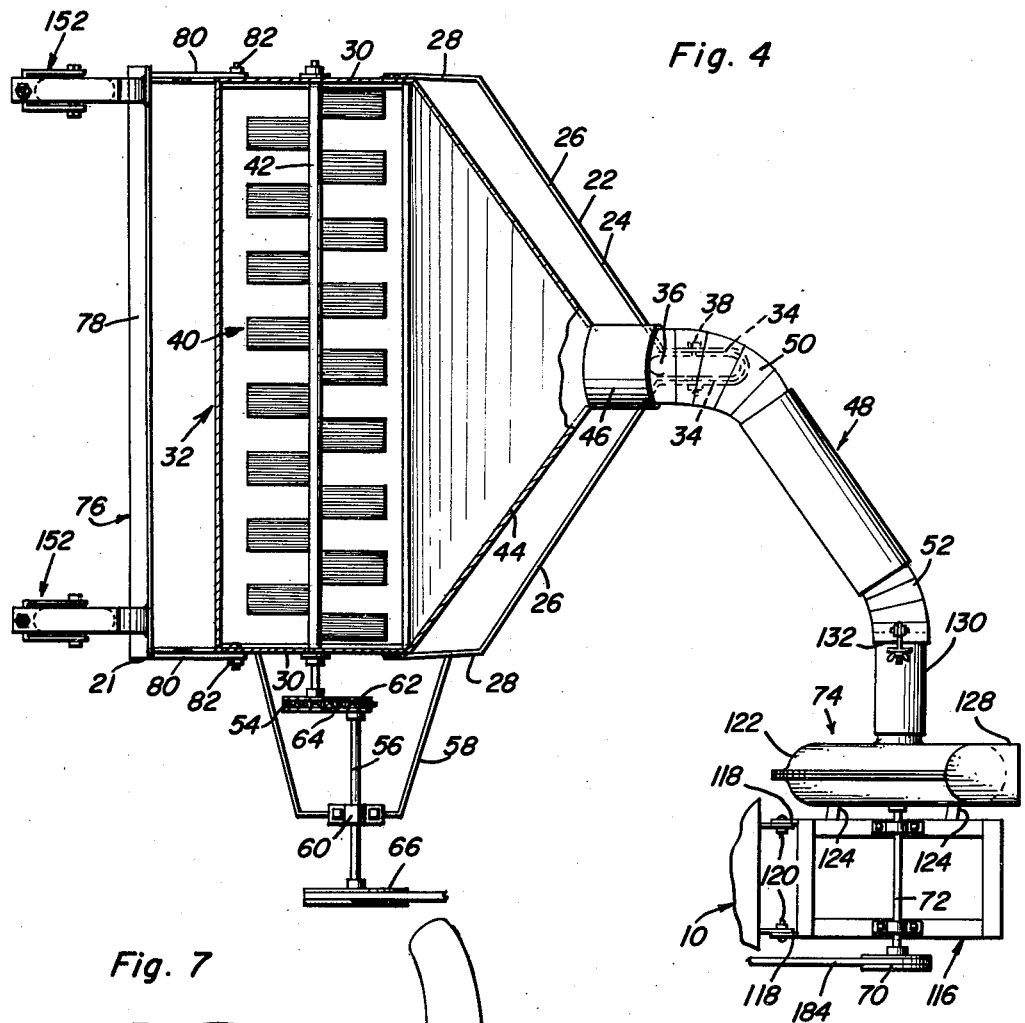

3,184,777
LAWN SWEEPER
Walter E. Norden, 843½ South D St., Broken Bow, Nebr.
Filed Mar. 7, 1963, Ser. No. 263,512
3 Claims. (Cl. 15—340)

This invention relates to a novel and useful lawn sweeper and more specifically to a lawn sweeper which is adapted to be propelled by a tractor-type of vehicle.

The lawn sweeper of the instant invention includes power input shaft means which may be drivingly connected to the power output shaft of the tractor it relies upon for its motive force and the input shaft of the attachment drives a generally cylindrical and rotatable brush which is supported from the attachment for engagement with the ground over which the attachment is moving. The attachment also includes a blower which may be drivingly connected to output shaft means of the tractor and which is utilized to create a partial vacuum in the area disposed immediately adjacent the power driven brush whereby the debris picked up by the brush will be sucked into and passed through the blower. It is to be understood that upon passing through the blower the debris picked up by the sweeper will be shredded into very fine pieces.

The sweeper attachment of the instant invention includes frame means having ground-engaging support wheels for supporting the attachment independently of the tractor to which it is secured. However, since the attachment is driven by means of power output shaft means carried by the tractor and it is quite likely that the movement of the tractor and the attachment over uneven terrain will effect vertical movement between the tractor and the attachment, means must be provided for maintaining the prime mover of the tractor in constant driving engagement with the input shaft of the attachment.

The main object of this invention is to provide a lawn sweeping attachment for a tractor constructed in a manner whereby the attachment may be readily dismounted from the tractor and stored when it is not desired to use the attachment.

Another object of this invention is to provide a lawn sweeping attachment for a tractor including a rotatable brush assembly which may be utilized to brush the ground over which the attachment is pulled and including vacuum effecting means whereby a vacuum immediately adjacent the brush assembly may be effected in order to insure that all of the debris picked up by the brush assembly will pass through the lawn sweeping attachment.

Still another object of this invention is to provide the lawn sweeping attachment with a blower assembly for effecting a vacuum adjacent the lawn sweeping brush and constructed in a manner whereby the debris sucked thereinto will be finely shredded and/or broken up into small pieces for discharging from the outlet of the blower assembly.

A still further object of this invention, in accordance with the preceding object, is to provide a lawn sweeper including its own ground-engaging support wheels and yet constructed in a manner whereby the rotatable brush assembly and vacuum chamber thereof may be vertically adjustably positioned relative to the ground-engaging wheels of the attachment in order that the brush may be maintained in constant contact with the ground over which the attachment is being pulled even though the ground has an irregular surface.

Still another object of this invention is to provide an independently supported lawn sweeper for attachment to and movement by a tractor constructed in a manner whereby the self-supported lawn sweeper attachment will readily conform to the path of movement of the tractor.

A final object of this invention to be specifically enumerated herein is to provide a lawn sweeper in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional form of lawn tractor shown with the lawn sweeping attachment of the instant invention operatively associated therewith;

FIGURE 2 is a fragmentary longitudinal vertical sectional view taken substantially upon the plane indicated by the section line 2—2 of FIGURE 1;

FIGURE 3 is a longitudinal vertical sectional view similar to that of FIGURE 2 but showing the manner in which the articulated frame of the attachment may be adjusted so as to conform to an irregular ground surface;

FIGURE 4 is an enlarged top plan view of the lawn sweeper attachment shown with parts thereof being broken away and shown in section;

FIGURE 5 is an enlarged fragmentary longitudinal vertical sectional view taken substantially upon the plane indicated by the section line 5—5 of FIGURE 4;

FIGURE 6 is an enlarged fragmentary sectional view taken substantially upon the plane indicated by the section line 6—6 of FIGURE 2;

FIGURE 7 is a perspective view showing the blower assembly of the lawn sweeper attachment with a flexible accessory hose supported at one end from the inlet of the blower assembly and being utilized to pick-up lawn debris under a low object; and FIGURE 8 is a further flexible accessory conduit having a flared inlet end so as to be adapted to pick-up bulk debris such as a pile of leaves and/or twigs.

Referring now more specifically to the drawings the numeral 10 generally designates a conventional type of lawn tractor including a transversely extending power take-off shaft 11 which projects from opposite sides of the tractor 10. The pick-up attachment of the instant invention is generally designated by the reference numeral 12 and includes a drawbar frame generally referred to by the reference numeral 14. The drawbar frame 14 is constructed of an elongated angle iron 16 including vertical and horizontal flanges 18 and 20. The inboard end of the drawbar frame 14 is provided with any suitable means for removably securing the frame 14 to the tractor 10.

The pick-up attachment 12 includes front and rear frames 21 and 22. The rear frame 22 includes a section 24 which is generally Y-shaped in plane having a pair of forwardly divergent arms 26 including forwardmost angulated and generally parallel end portions 28 which are secured to the opposite side walls 30 of a downwardly opening housing generally referred to by the reference numeral 32. The rear portion of the section 24 includes a pair of angulated and generally parallel end portions 34 between which a rear wheel 36 is rotatably journaled by means of an axle assembly 38.

A roller brush assembly generally referred to by the reference numeral 40 and including a main shaft 42 is rotatably journaled between the side walls 30 of the housing 32. The housing 32 includes a rearwardly tapering portion 44 including an outlet neck 46 on its rearmost end which is communicated with the inlet end of a conduit generally referred to by the reference numeral 48 and including a flexible section 50 on the inlet end and a flexible section 52 on the outlet end. The shaft 42 has a sprocket wheel 54 mounted thereon and an input shaft 56 is rotatably journaled from the rear frame section 22 of the pick-up attachment 12 by means of suitable bracing 58 and journal means 60. One end of the input shaft has a sprocket wheel 62 mounted thereon which is aligned with the sprocket wheel 54 and drivingly connected thereto by means of an endless flexible chain 64. The other end of the input shaft 56 has a driving wheel 66 mounted thereon which is aligned with the driving wheel 68 mounted on the power take-off shaft 11. The end of the power take-off shaft 11 remote from the driving wheel 68 is also provided with a drive wheel (not shown) which may be aligned with the drive wheel 70 carried by the input shaft 72 of the blower assembly generally referred to by the reference numeral 74 which is supported from the rear of the tractor 10. Accordingly, it may be seen that the output shaft 11 may be used to drive both the brush assembly 40 and the blower assembly 74.

The front frame section 21 of the pick-up attachment 12 includes a generally U-shaped section 76 including a bight portion 78 which interconnects a pair of rearwardly projecting arms 80. The rear ends of the arms 80 are pivotally secured to the forward ends of the housing 32 by means of suitable pivot fasteners 82 and accordingly, it may be seen that the frame of the pick-up attachment 12 is articulated and that the front and rear frame sections 21 and 22 thereof may be pivoted relative to each other as may be seen from a comparison of FIGURES 2 and 3 of the drawings.

As may best be seen from FIGURES 1-3 of the drawings, the sprocket wheel 62 engages the mid-portion of one of the reaches of the endless flexible member 64 which is entrained about sprocket wheel 54 carried by the shaft 42 and an idler sprocket wheel 88 adjustably and rotatably supported from a standard 90 carried by one side wall 80 of the housing 32.

An upright standard 92 is supported from the forward frame section 21 and a second upright standard 94 is supported from the rear portion of the housing 32. A lever arm 96 is pivotally secured to the upper end of the standard 94 by means of a pivot pin 98 and has a handle portion 100 on one end while the other end is pivotally secured to one end of a connecting link 102 by means of a pivot pin 104. The other end of the connecting link 102 is pivotally secured to the upper end of the standard 92 by means of a pivot pin 106. A sector plate 108 is carried by the upper end of the standard 94 and has a plurality of arcuately arranged apertures 110 formed therein with the pivot pin 98 coinciding with the center of the curvature of the arc along which the apertures 110 are disposed. The pivot pin 98 is provided with a compression spring 112 that normally yieldingly urges a laterally outwardly projecting pin 114 carried by the lever arm 96 into seated engagement in a selected one of the apertures 110. In this manner, the front and rear sections 21 and 22 of the frame of the pick-up assembly 12 may be retained in adjusted rotated positions relative to each other.

The blower assembly includes a support frame generally referred to by the reference numeral 116 provided with a pair of apertured ears 118 for pivotally securing the frame 116 to the rear of the tractor 10 by means of pivot pins 120. The blower assembly 74 includes a rotor (not shown) which is secured to the shaft 72 within the housing 122 of the blower assembly 74. The housing 122 is also supported from the frame 116 by means of brackets 124 secured between the frame and the housing 122 in any convenient manner. The blower assembly housing 122 includes an outlet 128 and an inlet neck 130 to which the outlet end of the flexible section 52 is removably secured by suitable fastening means 132.

In addition to the conduit 48, there may be seen in FIGURES 7 and 8 of the drawings two auxiliary conduits generally referred to by the reference numerals 134 and 136. The auxiliary conduit 134 includes suitable securing means 138 for removably securing the outlet end thereof to the inlet neck 130 of the blower assembly 74. The conduit 134 may be utilized to suck up leaves 140 and the like from beneath low objects such as a porch 142, see FIGURE 7.

The conduit 136 is also provided with suitable latching or attaching means 146 for removably securing the outlet end thereof to the inlet neck 130 of the blower housing 74. The inlet end of the conduit 136 is provided with a flared snout 148 whereby the conduit 136 will be adapted to pick-up bulk material such as leaves and/or twigs which are arranged in piles.

The front section 21 of the frame of the pick-up attachment 12 is provided with a pair of forwardly directed support arms 150 which each supports from its forward end a caster wheel assembly generally referred to by the reference numeral 152. The housing 32 is connected to the angle iron 16 by means of a pair of pull arms 154 and 156 which are pivotally secured at their rear ends to the side walls 30 of the housing 32 by means of fasteners 158 and 160 respectively and to the angle iron 16 at their forward ends by means of suitable fasteners 162 and 164 respectively.

It will be noted that the wheel base of the attachment 12 is somewhat less than the wheel base of the tractor 10 inasmuch as the front and rear wheels 166 and 168 of the tractor 10 are spaced further apart than the front and rear wheels of the attachment 12. Therefore, as the tractor 10 moves over a slight depression 170 in the ground 180 the brush assembly 40 would be elevated relative to the upper surface of the ground. Accordingly, the lever 96 is provided whereby the front end of the rear section 22 may be lowered in order that the brush assembly 40 may be maintained in contact with the ground. It will be noted that when the attachment 12 drops down into a depression that the shaft 56 will be lowered relative to the output shaft 11. However, since the point of contact of the rear wheel 36 with the ground 180 defines the center of curvature of the path of movement of the shaft 56 relative to the shaft 11, it may be readily seen that an appreciable amount of movement of the shaft 56 relative to the shaft 11 may take place without appreciably changing the tension of the endless belt 181 which drivingly connects the wheels 166 and 168. As the radius of curvature of the movement of the shaft 56 during relative vertical movement between the pick-up attachment 12 and the tractor 10 is relatively great, the movement of the shaft 56 relative to the shaft 11 may be said to be substantially straight line movement.

The drive wheel or pulley 70 is drivingly connected to the end of the power take-off shaft 11 remote from the pulley wheel 68 by means of an endless flexible member 184 and accordingly, as the tractor drives the brush assembly 40 the blower assembly 74 will also be actuated. As the pick-up attachment 12 moves over the ground 180, the brush assembly thereof will pick-up any debris on the ground while the vacuum effected by the blower assembly 74 will insure that all of the debris picked up will be passed through the blower assembly 74 and not dropped back upon the ground. If it is desired a trailer generally referred to by the reference numeral 190 may be pulled behind the tractor 10 and provided with a load bed 192 into whose interior the debris passing through the blower assembly 74 may be directed by means of a flexible conduit 194 secured at one end to the outlet neck 128 of the blower housing 122 and communicated with the interior of the load bed 192 at the other end.

Although it may be desired in some instances to use the trailer 190 for retaining the debris picked up by means of the pick-up attachment 12, it has been found through use that the high speed of the blower assembly 74 will completely shred substantially all of the debris picked up by the pick-up attachment 12. Accordingly, when the outlet neck of the blower housing 122 is left open, the shredded debris is directed rearwardly of the driver of the tractor 10 and may be allowed to fall back down upon the ground to add nourishment thereto. If for some reason it is desirable not to have the shredded debris fall back upon the ground, then the trailer 190 may be used to store the debris as it is picked up.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor of the type including a transversely extending horizontally disposed power output shaft, a transversely extending and horizontally disposed drawbar supported from said tractor in an elevated position above the surface supporting said tractor and with said bar extending laterally of one side of said tractor, auxiliary ground engaging and supported load means, a pair of spaced apart trailing pull arms pivotally secured at their forward ends to said drawbar and at their rear ends to said load means for rotation about generally horizontal first and second axes, respectively, extending transversely of said tractor whereby forward movement of said drawbar will effect forward movement of said load means therebehind, said load means including a rotatable input shaft generally paralleling and substantially horizontally aligned with said output shaft and spaced longitudinally of said tractor relative to said output shaft, said shafts including aligned driving and driven wheels, an endless flexible member entrained over said wheels drivingly connecting said output shaft to said input shaft, said load means including a frame defining front and rear generally horizontally disposed frame sections pivotally secured together at adjacent end portions for rotation about a generally horizontally disposed transversely extending axis and including ground engaging support means at remote end portions and power actuated ground cover pickup means supported from said adjacent end portion of said rear section and driven by said input shaft, said input shaft being journaled on said rear section, the axis of rotation of said input shaft being displaced from the second pivot axis of said pull arms, means interconnecting said front and rear sections for releasably securing the latter in adjusted rotated positions relative to each other, the arc of swinging movement of said input shaft about the point at which the ground engaging support means at the rear end portion of the rear frame section is adapted to engage the ground during relative rotation of said frame sections having a radius sufficiently large whereby limited vertical movement of said input shaft from the position substantially horizontally aligned with said output shaft is substantially straight along a line disposed generally normal to a plane containing said input and output shafts when said shafts are horizontally aligned whereby relative movement between said input and output shafts may occur without excessively tensioning said endless flexible member.

2. The combination of claim 1 wherein said power actuated ground cover pickup means includes a downwardly opening inlet end of a vacuum conduit, a blower assembly supported from said tractor and including an inlet communicated with the outlet end of said conduit and and outlet having a discharge nozzle operatively associated therewith.

3. The combination of claim 1 wherein said input shaft is spaced forwardly of said output shaft whereby its arc of swinging movement opens toward said output shaft and thereby further facilitates vertical movement of said input shaft relative to said output shaft through a limited range without excessively tensioning said elongated endless flexible member.

References Cited by the Examiner
UNITED STATES PATENTS

| 2,364,043 | 12/44 | Ariens | 172—298 X |
| 2,627,713 | 2/53 | Manning | 15—340 X |
| 3,054,130 | 9/62 | Ferrari | 15—340 |

FOREIGN PATENTS

| 486,505 | 6/38 | Great Britain. |
| 847,709 | 9/60 | Great Britain. |

WALTER A. SCHEEL, *Primary Examiner.*